United States Patent [19]

Page et al.

[11] 4,161,390
[45] Jul. 17, 1979

[54] CALCINING KETTLE HAVING MULTI-PASS HEATING SYSTEM

[75] Inventors: John Page, Harvard; Francis R. Leding, Clarendon Hills, both of Ill.

[73] Assignee: United States Gypsum Company, Chicago, Ill.

[21] Appl. No.: 807,264

[22] Filed: Jun. 16, 1977

[51] Int. Cl.² .................... F27D 1/08; F27B 14/00
[52] U.S. Cl. .................................. 432/102; 165/109; 432/151
[58] Field of Search ................ 432/102, 151; 165/109

[56] References Cited
U.S. PATENT DOCUMENTS

| 577,059 | 2/1897 | McNeal | 432/151 |
|---|---|---|---|
| 1,446,863 | 2/1923 | Townley et al. | 432/102 |

*Primary Examiner*—John J. Camby
*Attorney, Agent, or Firm*—Samuel Kurlandsky; Robert H. Robinson; Glenn W. Ohlson

[57] ABSTRACT

A calcining apparatus comprising a kettle, a heating jacket surrounding the kettle defining a heating chamber, vertical baffles dividing said heating chamber into a plurality of chambers, and a plurality of horizontally disposed heating flues communicating with said chambers defining a path whereby the heating gas provided for heating said apparatus makes at least two horizontal passes through said kettle before being exhausted, the calcining apparatus being adaptable for calcining material such as gypsum in either a continuous or batch process.

12 Claims, 16 Drawing Figures

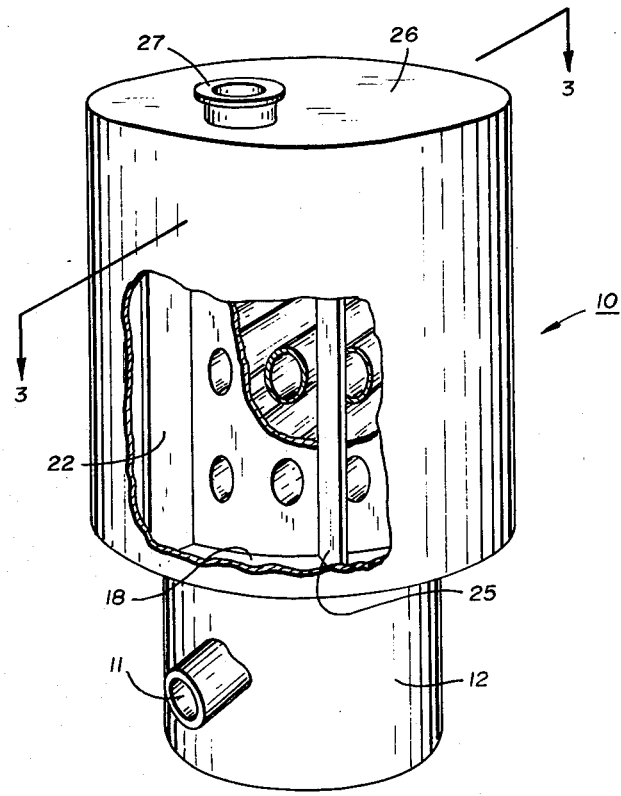

CALCINING KETTLE HAVING MULTI-PASS HEATING SYSTEM

BACKGROUND OF THE INVENTION (1) Field of the Invention

The present invention relates to apparatus for calcining gypsum and similar materials, and more particularly refers to an apparatus in which the heat applied for the calcining process is more efficiently utilized.

(2) Description of the Prior Art

Gypsum calcination may be carried out in either rotary kilns or in kettles. Either form of apparatus may be operated either continuously or batchwise.

In the process for calcining gypsum, gypsum in the form of calcium sulfate dihydrate is heated and converted to calcium sulfate hemi-hydrate, more commonly known as stucco or plaster. A large amount of heat is consumed in the calcining process. A portion of the heat is used to decompose the dihydrate crystals and transform them to the hemi-hydrate crystals. Additionally, a substantial amount of heat is utilized to drive off the water released in the calcining process. Various means are utilized for providing the necessary heat. In U.S. Pat. No. 3,901,645, a heating system is disclosed involving the use flat flame burners for heating the bottom wall of the kettle, and additionally a luminous wall furnace for heating the side wall of the kettle. However, when the heating means is applied solely to the walls of the kettle, the process is not as efficient as would be desirable. In U.S. Pat. No. 3,871,829, a horizontal calcining apparatus is shown as utilizing a gas flame for heating the horizontally disposed kettle. There again only the surface of the kettle imparts heat to the gypsum content being processed.

In U.S. Pat. No. 3,378,246, a vertical kettle type of calcining apparatus is disclosed utilizing a heating chamber through which hot gasses are passed for heating the kettle. However, here to, only the walls of the kettle transmit heat to the gypsum content inside also resulting in a somewhat decreased efficiency in terms of heat utilized.

Because of the present crisis due to the scarcity and high cost of fuel of various forms, it is highly desirable and important to develop a calcining apparatus which is more efficient in fuel utilization.

SUMMARY OF THE INVENTION

It is therefore an object of the present invention to provide a calcining apparatus which can utilize fuel required for the calcining process much more efficiently.

It is a further object to provide a calcining apparatus which can process a substantially larger amount of material to be calcined within a given period of time.

It is still further an object to provide a calcining apparatus which can be utilized in either a continuous or batch-wise process.

It is another object to provide a calcining apparatus offering the advantages described above, but which still can be built at a reasonably low cost.

These and other objects, advantages and functions of the invention will be apparent upon reference to the specification and to the attached drawings illustrating preferred embodiment of the invention, in which like parts are identified by like reference symbols in each of the views.

According to the invention a calcining apparatus is provided which offers more efficient heat utilization comprising a vertical calcining kettle having a heating chamber surrounding the kettle, a plurality of vertical baffles dividing the heating chamber into a plurality of vertical chambers, and a plurality of heating flues horizontally disposed within the kettle and communicating with the heating chambers.

DESCRIPTION OF THE PREFERRED EMBODIMENTS

Figure 1:
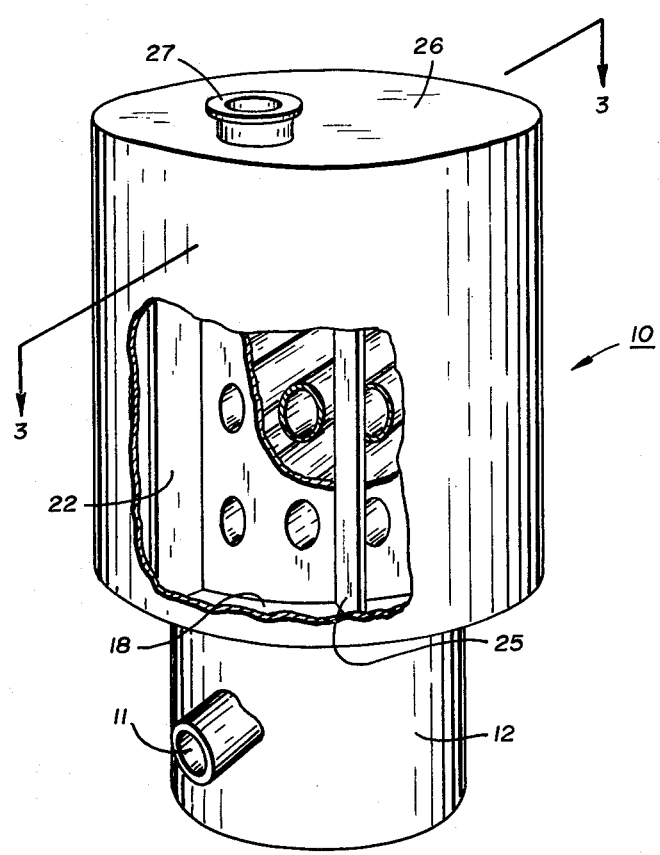
FIG. 1 is a perspective view, partially broken away, of a gypsum calcining kettle showing one embodiment of the present invention.
Figure 3:
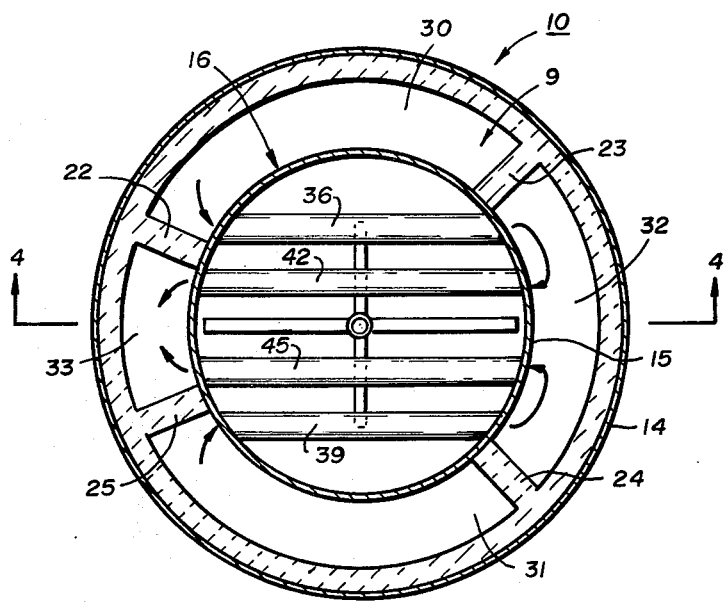
FIG. 3 is a horizontal sectional view taken at the line 3 — 3 of FIG. 1, looking in the direction of the arrows.
Figure 4:
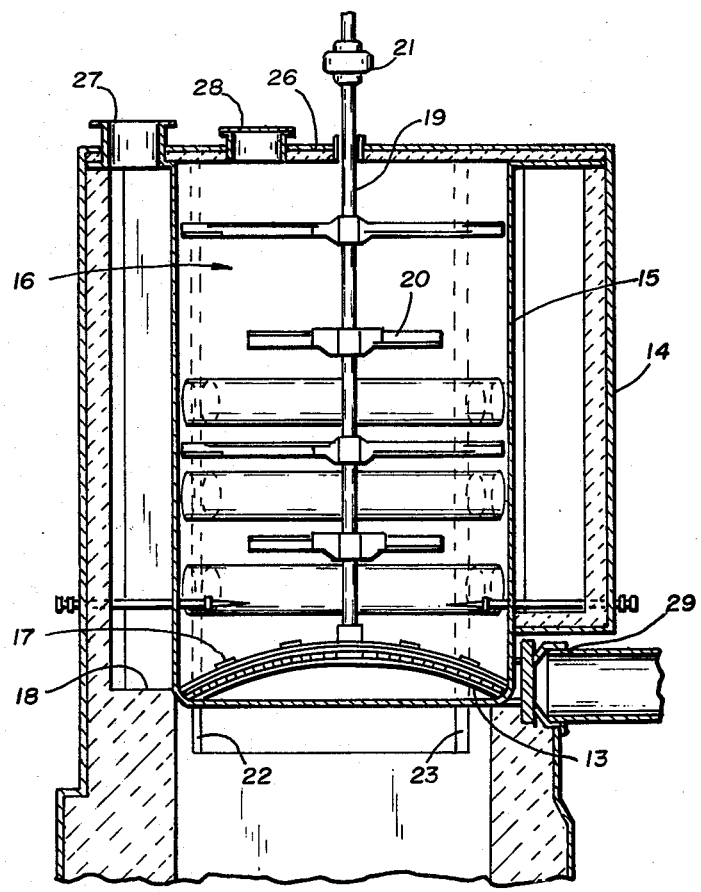
FIG. 4 is a vertical sectional view taken at the line 4 — 4 of FIG. 3, looking in the direction of the arrows.

Referring to the drawings, and particularly FIGS. 1, 3 and 4 thereof, there is illustrated a calcining apparatus 10 comprising a kettle 16 of generally cylindrical form having a bottom wall 13 and side wall 15 of heat conductive material such as iron or steel. The kettle 16 is surrounded by a kettle jacket 14 which is spaced from the walls of the kettle 16 to provide a chamber 9 therebetween. The kettle 16 is equipped with conventional sweep 20 and drag 17 both connected to a rotating kettle shaft 19. A coupling 21, located above the cover 26, connects the kettle shaft 19 to a rotating means not shown in the drawings.

Referring to FIGS. 1 and 3, full-height baffles 22–25 are positioned within the chamber 9 between the kettle jacket 14 and the kettle sidewall 15, extending from the cover 26 downward to the chamber floor 18. The baffles divide the chamber 9 into four chambers members, oppositely disposed entrance chamber member 30 and 31, an inter-pass chamber member 32 and an exhaust chamber member 33.

A plurality of first-pass flues 34–39 are horizontally positioned within the kettle with their ends affixed at opposite sides of the kettle wall. The flues 34–39 are tubular and formed of corrugated steel tubing having a circular cross-section, or, if desired, other cross-sections such as an eliptical cross-section. One end of each of the flues 34–39 communicates with the entrance chamber 30, and the other end of each communicates with the inter-pass chamber member 32.

A plurality of second-pass flues 40–45 of structure and material similar to that of the first-pass flues 34–39 are horizontally mounted substantially parallel within the kettle and affixed to the walls thereof. The openings or bores of the flues 40–45 each communicate at one end with the inter-pass chamber member 32 and at the other end with the exhaust chamber member 33.

As shown in FIG. 1, the orientation of the flues is parallel to the position of the horizontal central axis of burner 11. In this embodiment, the entrance of burner 11 into firebox 12 is located directly below breach 27 at the top of calcining kettle apparatus 10. Hot combustion gasses initially bifurcate after leaving firebox 12 and move upwardly solely into either entrance chambers 30 or 31. The embodiment shown in FIGS. 1–4 is depicted as a batch calcination method. Through inlet port 28 the raw gypsum is fed and the product is later drawn off through discharge gate 29. It is to be noted that the invention may also be used with a continuous calcination method utilizing the teachings of U.S. Pat. No. 3,379,246 to Leding.

Figure 2:
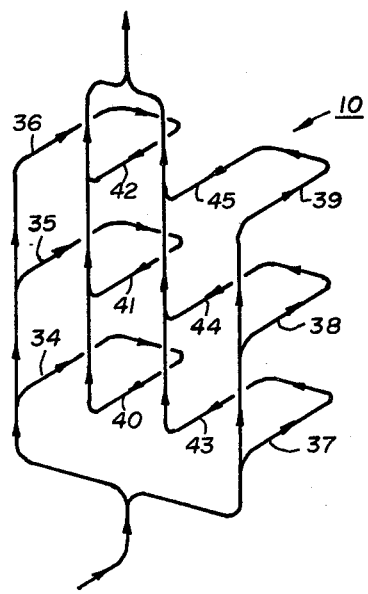
FIG. 2 is a flow diagram illustrating the heat flow through the embodiment shown in FIG. 1.

Referring to FIG. 2, the combustion gasses from the firebox 12 enter either entrance chamber member 30 or 31 in approximately the same flow velocity. The combustion gasses entering entrance chamber member 30 follow a path through the first-pass flues 34–36. The combustion gasses entering into the entrance chamber member 31 follow a path through the first-pass flues 37–39. Flues 34–39 therefore constitute a first-pass through the kettle 16. Exiting from the first-pass of flues the combustion gasses enter the inter-pass chamber member 32. The path of the gasses is then through the second-pass flues 40–45. Flues 40–45 thus constitute a second-pass through kettle 16. The combustion gasses from the second-pass then enter exhaust chamber member 33 and exit the calcining kettle apparatus 10 through the breach 27.

Referring to FIGS. 3 and 4, the baffles 22, 23, 24 and 25 are shown permanently sealed by conventional means to the inner surface of the kettle jacket 14. A conventional permanent seal is similarly provided between the top end of each of these baffles with the jacket. A conventional movable seal is located between each of the edges of baffles 22, 23, 24 and 25 and the kettle side wall 15. A conventional movable seal is provided between the bottom ends of each of the baffles and the chamber floor 18.

Figure 5:
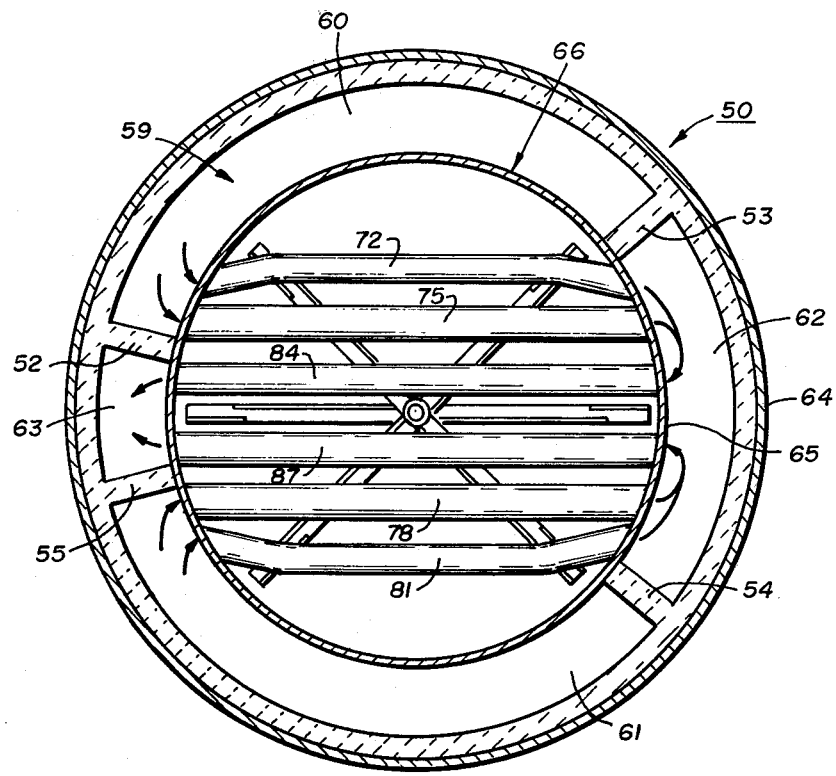
FIG. 5 is a horizontal sectional view of a gypsum calcining kettle showing another embodiment of the invention.
Figure 6:
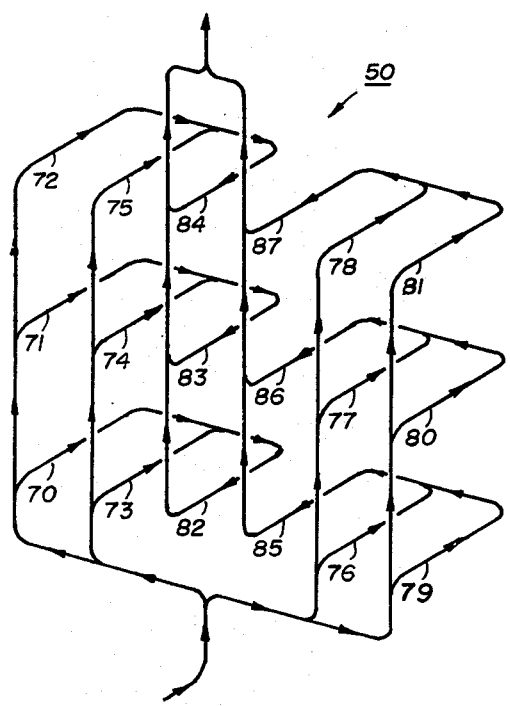
FIG. 6 is a flow diagram illustrating the heat flow for the embodiment shown in FIG. 5.

FIGS. 5 and 6 illustrate another embodiment of the present invention. In this embodiment a complex two-pass calcining apparatus 50 is shown which includes two additional columns of first-pass flues over and above those of the embodiment of FIGS. 1–4. The vertical section shown in FIG. 4 is still, however, representative of the structure of the embodiment of FIGS. 5 and 6.

Referring to FIGS. 5 and 6, the apparatus 50 comprises a kettle 66 having a sidewall 65, and having a kettle jacket 64 surrounding the kettle 66 and spaced apart therefrom to provide a heating chamber 59. Full height baffles 52–55 are positioned between the kettle sidewall 65 and the kettle jacket 64, and sealed thereto in the same manner as described in regard to the movable and permanent seals in the embodiment of FIGS. 1–4. The baffles cooperate with the kettle jacket 64 and the kettle sidewall 65 to define the following: a pair of entrance chamber members 60 and 61 which are oppositely positioned; an inter-pass chamber 62; and, an exhaust chamber 63.

Disposed within the kettle 66, and having their ends affixed thereto, are a plurality of tubular first-pass flues 70–81. The flues are of the same structure and material as those described in regard to the embodiment of FIGS. 1–4. The tubular bore or channel of each flue communicates at one end with the entrance chambers 60 and 61, and at the other end with the inter-pass chamber 62. A plurality of second-pass flues 82–87 are similarly disposed horizontally within the kettle, each having one end of its channel or bore communicating with the inter-pass chamber member 62 and the other end with the exhaust chamber member 63.

Referring to FIG. 6, the flow of combustion gasses is shown. Combustion gasses from the firebox initially bifurcate and move upwardly solely into either entrance chamber member 60 or 61 shown in FIG. 5. The hot gasses in entrance chamber member 60 flow in a first-pass through flues 70–75. The hot gasses entering the entrance chamber member 61 flow in a first-pass through flues 76–81. After leaving the first-pass flues, the hot gasses then enter the inter-pass chamber member 62. Two columns of three tiers each comprise a second pass flue construction, and include flues 82–87. Upon leaving the second-pass, the hot gasses enter exhaust chamber member 63 and move vertically out of the apparatus 50 through a breach similar to the one shown in FIG. 1 designated by the number 27.

The discussion of permanent and movable seals for the embodiment of FIGS. 1–4 apply equally to the embodiment shown in FIGS. 5 and 6. Sealing each baffle at its top, bottom, inside and outside edge prevents the hot combustion gasses from short-circulating their path through the flues.

Figure 7:
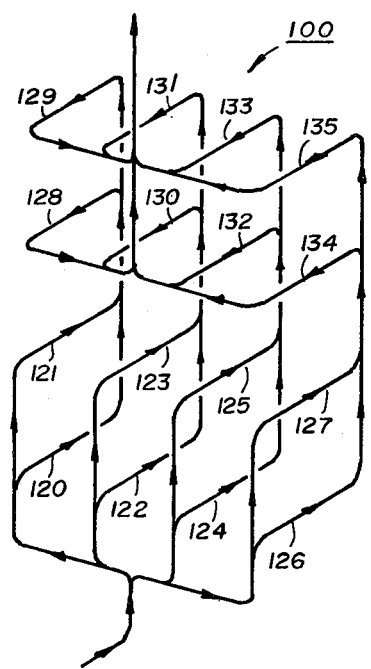
FIG. 7 is a flow diagram showing the heat flow of another embodiment of the invention.
Figure 8:
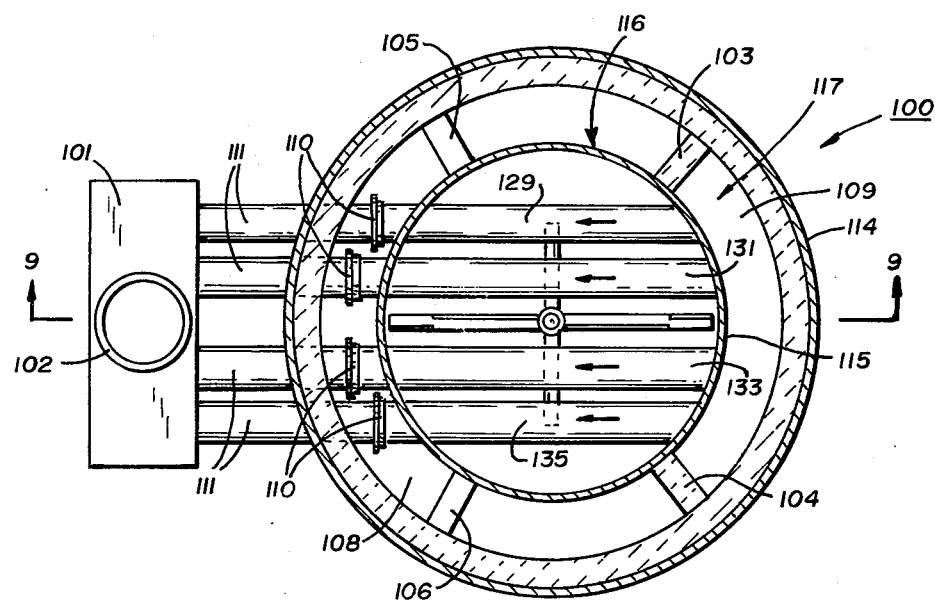
FIG. 8 is a horizontal sectional view of a gypsum calcining kettle having a heat flow pattern as shown in the diagram of FIG. 7.
Figure 9:
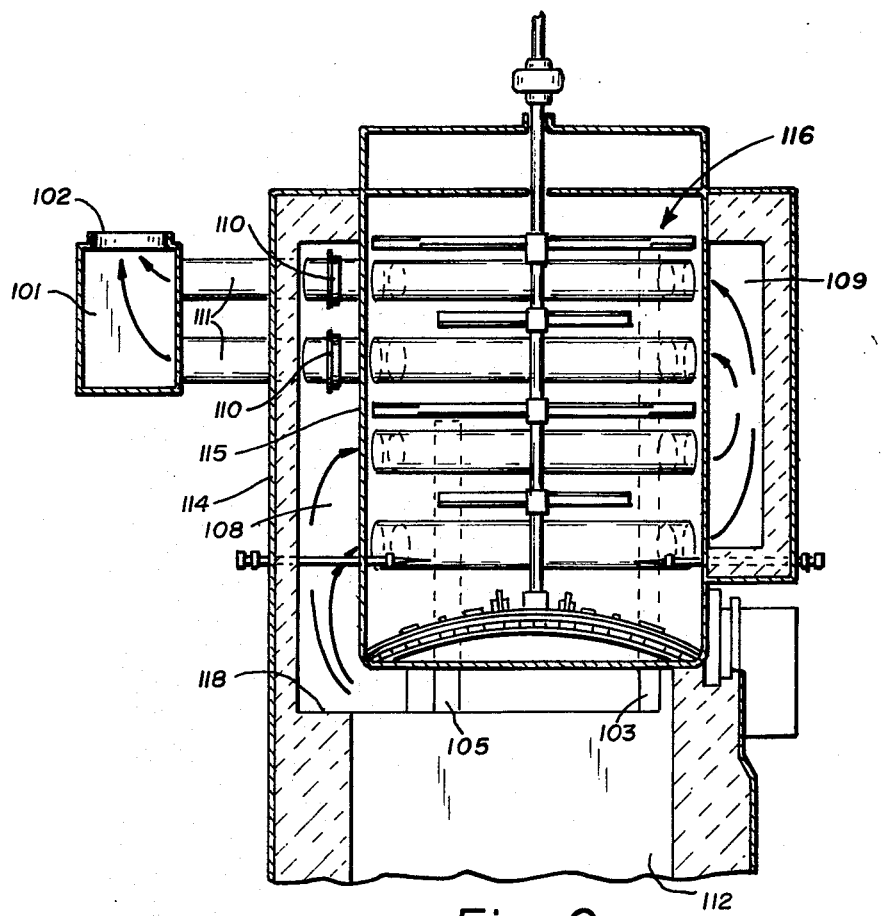
FIG. 9 is a vertical sectional view taken at the line 9 — 9 of FIG. 8, looking in the direction of the arrows.

Referring to FIGS. 7, 8 and 9, another embodiment of the invention is shown in the form of a two-pass calcining apparatus 100 having an outside exhaust plenum 101 for removing the heating fluid. As shown in FIG. 7, the hot gasses flow from the firebox 112 through the various flues and are then exhausted from a breach 102. The apparatus further comprises a kettle 116 having a sidewall 115 and surrounded by a kettle jacket 114 cooperating with the kettle sidewall to define a heating chamber 117. Full length baffles 103 and 104 are vertically disposed intermediate the jacket 114 and the sidewall 115 to define two chamber members, an entrance chamber member 108 and an inter-pass chamber member 109. Mid-height baffles 105 and 106 are disposed in the entrance chamber 108 in order to promote the even distribution of heat by agitating circulation within the entrance chamber.

A plurality of first pass flues 120–127 of a shape and material similar to that previously described are horizontally disposed in the kettle 116 with their ends affixed to the sidewall 115 of the kettle. One end of the inner bore or channel of each of the first-pass flues is connected to the entrance chamber member 108, and the other end of each is connected to the inter-pass chamber 109.

A plurality of second-pass flues 128–135 similar in structure to those of the first-pass flues are horizontally disposed within the kettle 116 with their ends affixed to the kettle wall. The inner bore or channel of each second-pass flue is connected at one end to the inter-pass chamber member 109 and at the other end to the exhaust plenum 101 by means of flexible sealing joints 110 and heat exchanger tubes 111.

FIG. 7 shows the flow diagram for the combustion gasses of the double deck two-pass calcining apparatus 100. The combustion gasses leave the firebox 112 and enter the first-pass flues 120–127 which, as illustrated, are horizontally disposed in two tiers of four flues each. Upon leaving the first-pass flues, the combustion gasses enter the inter-pass chamber member 109 and move vertically to enter the second-pass horizontal flues 128–135. As seen in FIG. 8, the combustion gasses leave the second-pass flues by means of a series of heat exchanger tubes 111 connected to the flues by means of flexible sealing joints 110. The second-pass combustion gasses flow through kettle jacket 114 and then into an outside exhaust plenum 101. The combustion gasses exit from the outside exhaust plenum 101 through a breach 102 provided at the top of the plenum.

Figure 15:
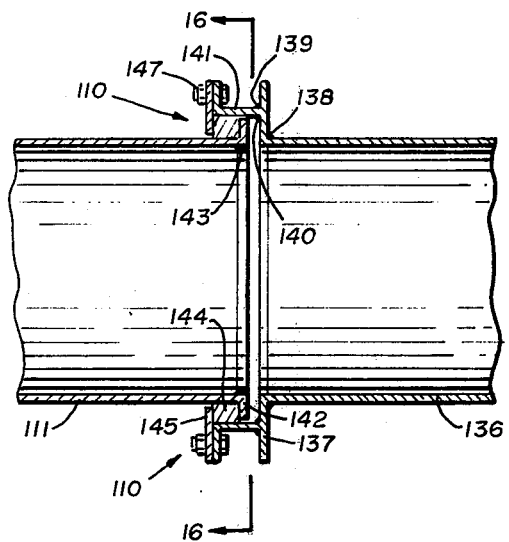
FIG. 15 is a longitudinal sectional view of a seal used in the embodiments of the invention shown in FIGS. 8 and 12.
Figure 16:
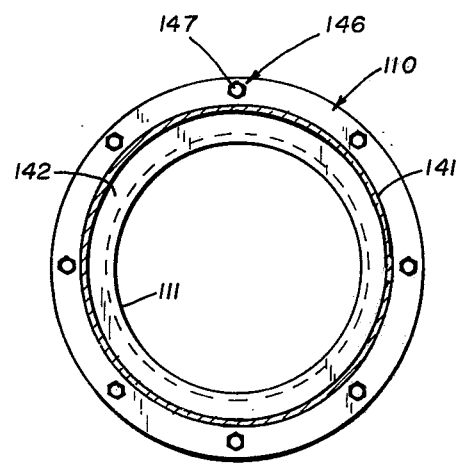
FIG. 16 is a transverse sectional view taken at the line 16 — 16 of FIG. 15, looking in the direction of the arrows.

Referring to FIGS. 15 and 16, the structure of the flexible sealing joint 110 is illustrated in detail, and is designed to prevent combustion gasses distributed within the entrance chamber member 108 from short-circuiting the intended path through first-pass flues and exiting directly out through the outside exhaust plenum 101. Due to the large differences in temperatures that are experienced within the entrance chamber member 108, the flexible sealing joint 110 must accommodate the resultant expansion and contraction of the second-pass flues and heat exchanger tubes 110. In FIG. 15, the flue 136 has a flue ring 137 secured to its end by means of a weld 138. A formed angle ring 141 is attached to the flue ring 137 by means of welds 139 and 140. A heat exchanger tube ring 142 is secured to the heat exchanger tube 111 by means of a weld 143. A kaolin wool insulation 144 is packed around the lip between the heat exchanger tube ring 142 and the heat exchanger tube 111. A securing ring 145 is placed around the heat exchanger tube 111 and contacts the formed angle ring 141. In this preferred embodiment both formed angle ring 141 and securing ring 145 are provided with eight holes 146 which are equally spaced. Eight suitable fastening means 147 are inserted through the eight holes 146 and thereby secure heat exchanger tube ring 142 to formed angle ring 141 and provide the effective seal required. In this embodiment of the invention the flue ring 137, the formed angle ring 141, the heat exchanger tube ring 142 and the securing ring 145 are formed of steel. The heat exchanger tube 111 is likewise formed of steel and has a circular cross-section. Flue 136 is formed of corrugated steel in the preferred embodiment and also has a circular cross-section; however, the flexible sealing joint 110 is equally adaptable to a flue having an eliptical cross-section.

Figure 11:
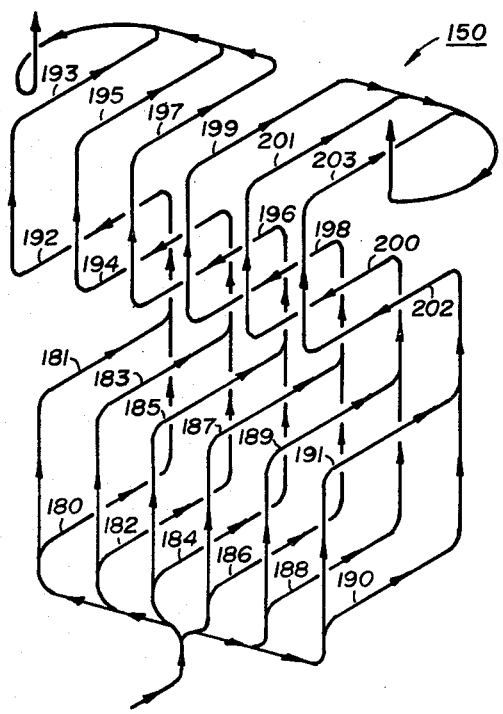
FIG. 11 is a diagram depicting the heat flow for the embodiment shown in FIG. 10.
Figure 12:
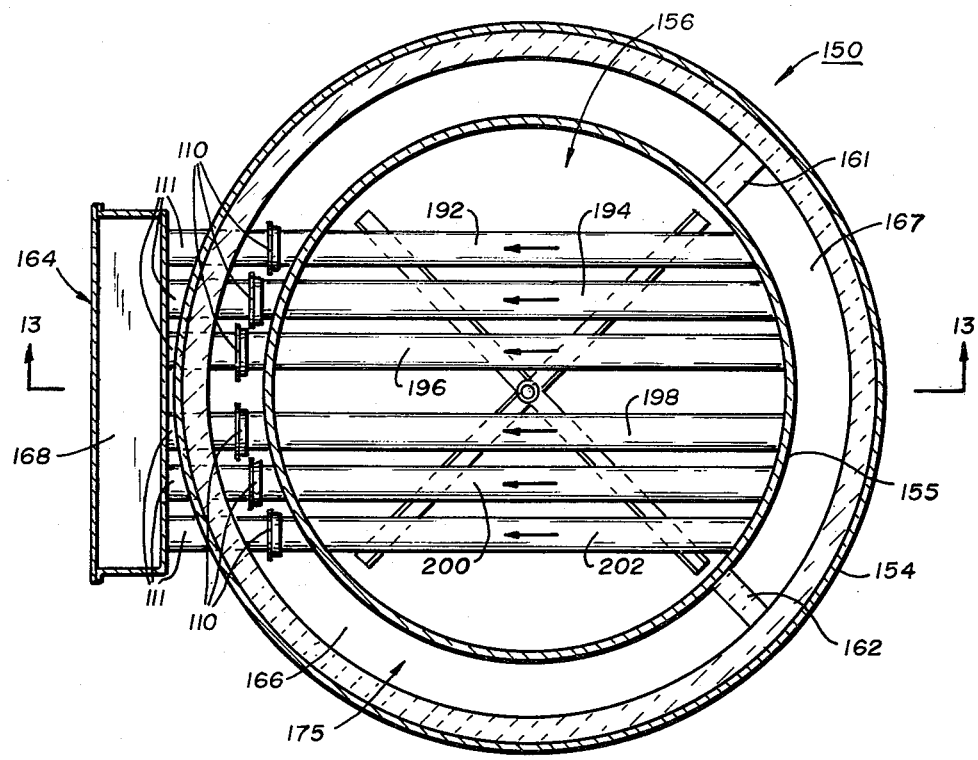
FIG. 12 is a horizontal sectional view taken at the line 12 — 12 of FIG. 10, looking in the direction of the arrows.
Figure 13:
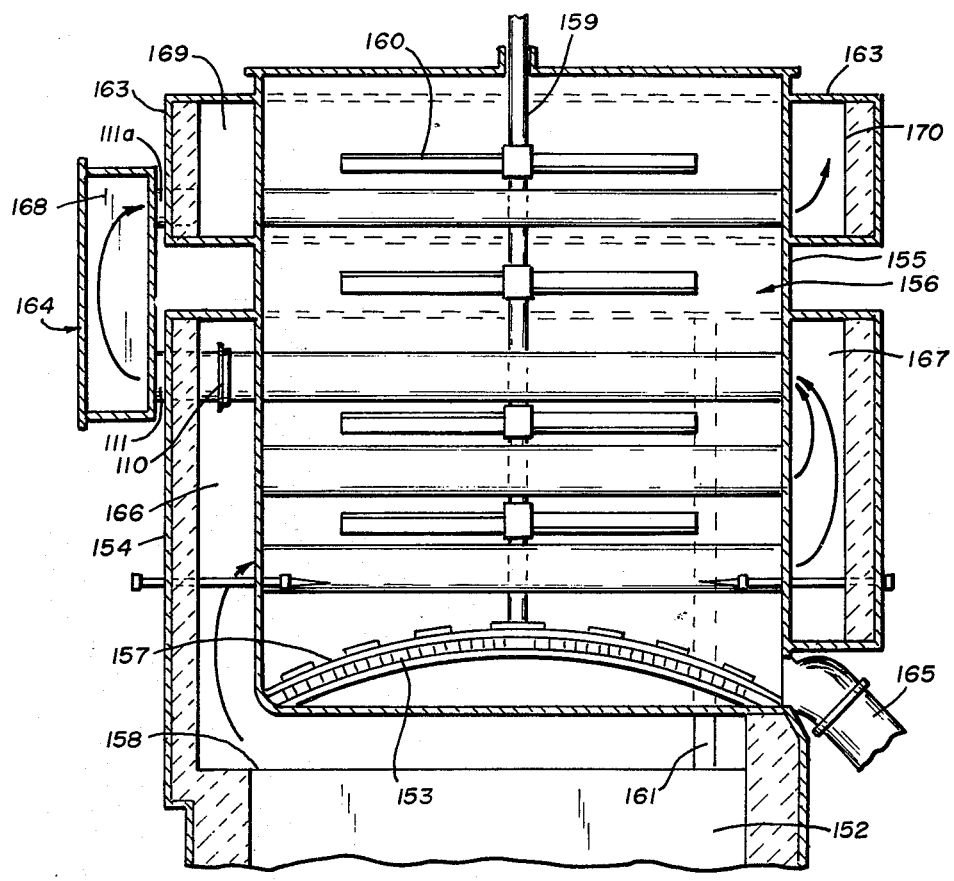
FIG. 13 is a vertical sectional view taken at the line 13 — 13 of FIG. 12, looking in the direction of the arrows.

Referring to FIGS. 10–13, a three-pass calcining apparatus 150 is shown comprising a burner 151 arranged to heat a firebox 152. A kettle 156 having sidewalls 155 and a bottom wall 153 is mounted over the firebox 152. Vertically disposed within the kettle is a central kettle shaft 159 with attached sweeps 160 and a drag 157. A discharge gate 165 is provided for dumping the contents when the kettle is used for batch operations. However, as is the case with the prior embodiments discussed, either continuous or batch calcining processes may be employed by conventional modification of the apparatus. Surrounding the kettle 156 are kettle jackets 154 and 163 vertically spaced apart from each other. The kettle jacket 154 is spaced apart from the kettle sidewalls 155 and cooperates therewith to define an annular heat chamber 175 surrounding the kettle. The kettle jacket 163 is spaced away from the kettle sidewalls 155 to define an annular heat chamber 176 therebetween. As shown in FIG. 13, the heat chamber 175 is provided with a bottom 158 extending circumferentially about the kettle 156.

Figure 10:
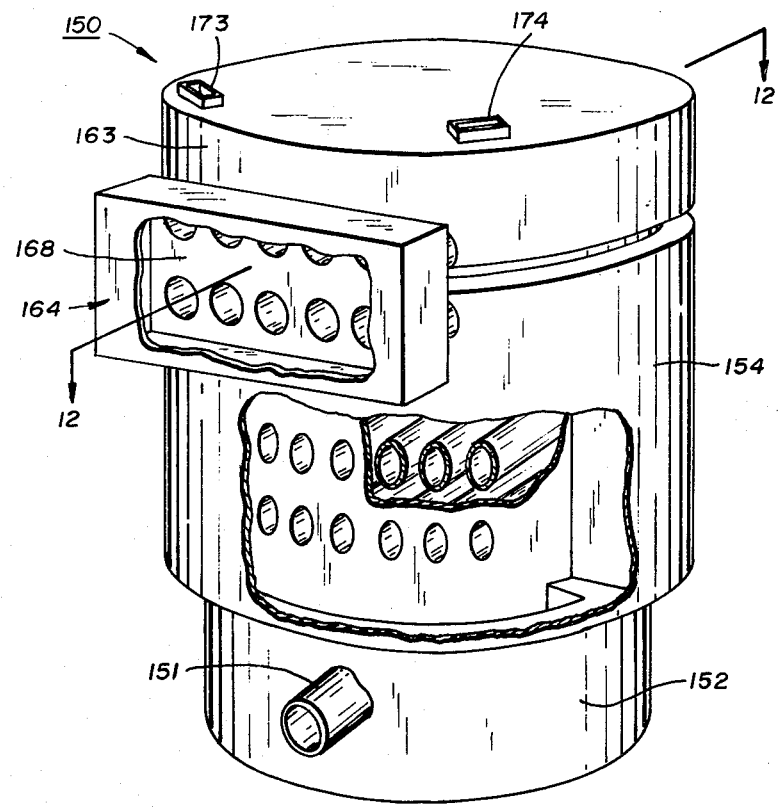
FIG. 10 is a perspective view, partially broken away, of a multi-pass gypsum calcining kettle comprising another embodiment of the present invention.

Referring particularly to FIGS. 10 and 12, the internal structure of the apparatus is shown having baffles 161 and 162 vertically positioned within the heat chamber 175 extending from the top of the jacket 154 to the chamber bottom 158. The baffles are sealed to the kettle sidewall 155, to the top and inside walls of the jacket 154 and to the chamber bottom 158, thereby defining an entrance chamber member 166 and an inter-pass chamber member 167.

As described previously with respect to FIGS. 1–4, the baffles 161 and 162 are permanently sealed at the top end and along the edge in contact with the jacket 154, but are movably or flexibly sealed at the bottom end and along the edge in contact with the kettle sidewall 155. The inter-pass chamber member 167 is sealed from the firebox 152. The entrance chamber member 166 is open to the firebox 152.

Figure 14:
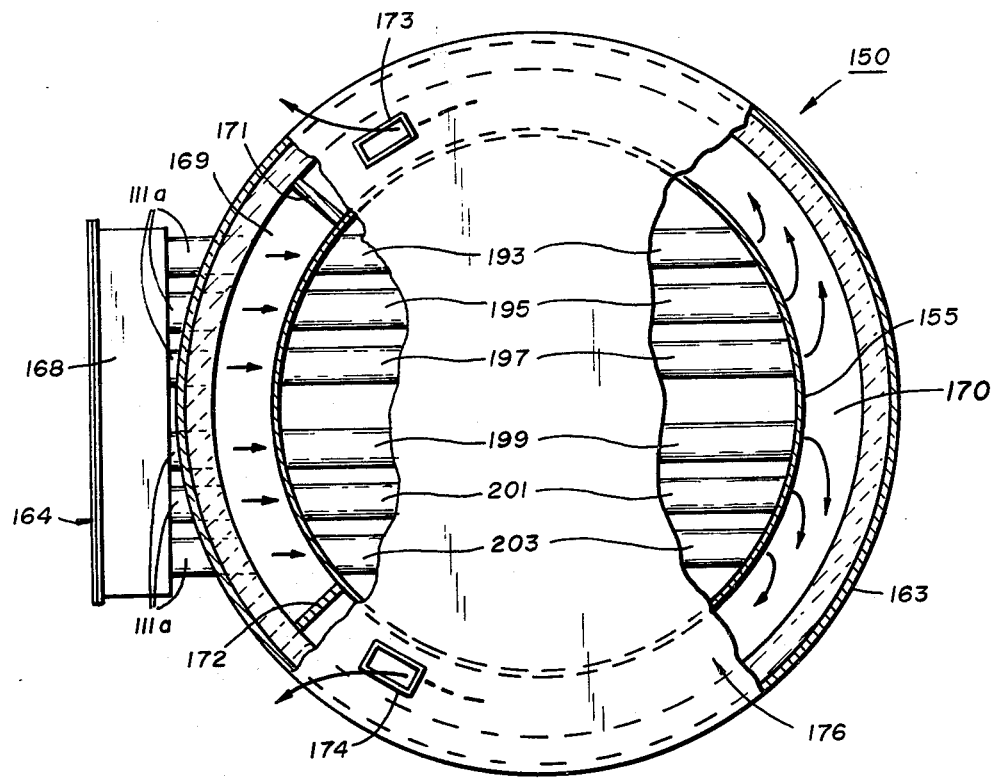
FIG. 14 is a top view, partially broken away, showing the structure of the apparatus shown in FIG. 10.

Referring to FIGS. 13 and 14, baffles 171 and 172 are positioned vertically within heat chamber 176 and each is sealed at the top, bottom and both sides, thereby to create two chamber members within heat chamber 176. Entrance chamber member 169 is defined within heat chamber 176 between baffles 172 and 171 looking clockwise therebetween. The remainder of heat chamber 176 located clockwise from baffle 171 to 172 is exhaust chamber member 170.

Referring to FIGS. 11–13, two bottom rows of flues 181–191 comprise the first-pass flues. Flues 181–191 are horizontally disposed across kettle 156 and open at one end into the entrance chamber member 166, and open at the other end into the inter-pass chamber member 167.

A plurality of second-pass flues 192, 194, 196, 198, 200 and 202 are supported at their ends at either side of the kettle 156. They are horizontally disposed in the same orientation as the flues 181–191, and are positioned in a plane parallel to the plane of the two lower tiers of first-pass flues. The second-pass flues open at one end into the inter-pass chamber member 167 and are supported at that end by the kettle 156. At their other ends they are connected to heat exchanger tubes 111 by means of flexible sealing joints 110, the entire assembly being disposed within entrance chamber member 166 but sealed therefrom. An effective seal is required here as discussed with respect to the embodiment of the invention shown in FIGS. 7–9, and FIGS. 15 and 16. Heat exchanger tubes 111 pass through the kettle jacket 154 and engage the outside inter-pass plenum 164. The heat exchanger tubes 111 are connected with the inter-pass chamber member 168 of the outside inter-pass plenum 164. A top row of heat exchanger tubes 111a engage the outside inter-pass plenum 164 and open into the inter-pass chamber member 168. At their other end, heat exchanger tubes 111a pass through kettle jacket 163 and open into entrance chamber 169 and are supported at this end by kettle jacket 163.

Referring to FIGS. 11, 13 and 14, a top row of third-pass flues 193, 195, 197, 199, 201, and 203 are horizontally disposed through kettle 156 and and are positioned in the same plane as heat exchanger tubes 111a, which plane is parallel to the plane of the second-pass flues 192, 194, 196, 198, 200 and 202. The third-pass flues open into the exhaust chamber 170 at one end and are supported at that end by the kettle sidewall 155. At the other end, the third-pass flues open into the entrance chamber member 169 opposite the openings of heat exchanger tubes 111a and are supported at this end by the kettle sidewall 155.

Referring to FIGS. 10 and 14, breaches 173 and 174 open upwardly from exhaust chamber 170 of kettle jacket 163. Breaches 173 and 174 are preferably located relatively near respective baffles 171 and 172 so that the combustion gasses move in a final pass through the annular exhaust chamber 170 for efficient utilization of the gasses heating capacity prior to exhaustion.

With specific reference to FIG. 11, a flow plan of the embodiment of FIGS. 10-13 is shown. The combustion gasses in the firebox 152 move solely into the entrance chamber member 166 of chamber 175. Inter-pass chamber member 167 is sealed from the firebox 152. Flexible sealing joint 110 prevents combustion gasses from short-circuiting and exiting the entrance chamber member 166 by way of the inter-pass chamber member 168. The combustion gasses flow evenly through the first-pass flues 181-191 arranged in two tiers with six flues in each tier. The combustion gasses then enter the inter-pass chamber member 167 and move vertically to enter second-pass flues 192, 194, 196, 198, 200 and 202. After the second-pass through kettle 156 the combustion gasses pass through the flexible sealing joint 110 and enter the heat exchanger tubes 111. The gasses then enter the inter-pass chamber member 168 of outside inter-pass plenum 164 and move vertically to the openings at the upper side to enter an upper row of heat exchanger tubes 111a. The gasses pass through the kettle jacket 163 by way of the heat exchanger tubes 111a and enter entrance chamber member 169 of kettle jacket 163. The third-pass through kettle 156 is accomplished by the gasses passing through the third-pass flues 193, 195, 197, 199, 201 and 203. Leaving the third-pass flues, the hot gasses enter the exhaust chamber member 170 of the kettle jacket 163. The gasses then flow both clockwise and counter clockwise around and through enclosed chamber 170 in a final pass until reaching breaches 173 and 174. The gasses then leave the kettle jacket 163 exiting vertically through the breaches.

In constructing the calcining apparatus of the present invention, a variety of materials conventional in the art may be used. The kettle may be made of steel. The various jackets may be made of steel with a refractory material lining the inner surface of the jacket. Insulation brick or insulation block may also be used. Firebrick is generally used only in the firebox. The flues may be formed conventionally of steel tubing having either a round or oval cross-section. In the embodiment shown in FIGS. 10-13, although the chamber 167 is shown divided by baffles 161 and 162 into an entrance chamber 166 and a discharge or exit chamber 167, alternatively the heat exchanger tubes 111a may be connected directly to the third-pass flues 193, 195, 197, 199, 201 and 203, the other ends of the flues then connecting with the overall undivided discharge chamber 175, which may include the entire space between the kettle and the jacket 163.

The calcining apparatus of the present invention has a number of advantages over existing calcining apparatus. The first advantage is that by passing the heating fluid through two or more separate passes through the kettle, the heat is much more efficiently utilized. It has been calculated that twenty percent (20%) less heat is required to treat the same amount of gypsum as required with conventional kettles. Conversely, the time required to completely calcine a kettle full of gypsum has been reduced by about twenty percent (20%). As a result of these economies, wherein each kettle can produce twenty percent (20%) more product within a given time, the number of kettles required may be reduced, or, alternatively, increased production may be obtained without the need for adding additional equipment. The calcining apparatus may be readily constructed of conventional materials. The structure also lends itself to the reworking existing conventional kettles to enable them to provide greater output per unit time. The construction of the apparatus does not require any greater skill than does conventional apparatus, and the cost for additional materials is relatively small.

In all embodiments of the invention illustrated in FIGS. 1-6 the kettle is supported at its upper surface by a supporting structure, such as I-beams or channels, which extend from a structural framework, with the kettle jacket sealed and mounted around the kettle.

In the preferred embodiments illustrated in FIGS. 1-6, any possible short-circuiting of combustion gasses from the firebox into the exhaust chamber is reduced by providing an exhaust chamber that extends for less than 90° around the kettle. The movable seal at the lower end of the exhaust chamber most effectively reduces short-circuiting of the gasses from the firebox by having the exhaust chamber extending for less than 90° around the kettle.

It is to be understood that the invention is not to be limited to the exact details of construction or operation or materials shown and described, as obvious modifications and equivalents will be apparent to one skilled in the art.

Invention is claimed as follows:

1. A calcining apparatus comprising a calcining kettle of generally cylindrical form having side and bottom walls of heat conductive material and defining a unitary calcining chamber, a jacket surrounding said kettle and spaced therefrom to define an annular heating chamber for containment of a heating medium, at least two vertically oriented baffles arranged between and sealed to said kettle side wall and said jacket dividing said heating chamber into at least two heating chamber members extending along substantially the entire length of said jacket, one an entrance chamber member and the other an inter-pass chamber member, a plurality of substantially tubular first-pass flues horizontally positioned and disposed within said kettle each having one end connected to said entrance chamber and the other end connected to said inter-pass chamber, a plurality of second pass flues horizontally positioned and disposed within said kettle mounted each having one end connected to said inter-pass chamber, and means connected to the other ends of said second pass flues for exhausting the heating medium therefrom.

2. A calcining apparatus comprising a calcining kettle of generally cylindrical form having side and bottom walls of heat conductive material and defining a unitary calcining chamber, a jacket surrounding said kettle and spaced therefrom to define an annular heating chamber for containment of a heating medium, four spaced-apart vertically oriented baffles arranged between and sealed to said kettle sidewall and said jacket dividing said heating chamber into four chamber members extending along substantially the entire length of said jacket, including a pair of oppositely disposed entrance chamber members, an inter-pass chamber member, and an exhaust chamber member, a plurality of substantially tubular first-pass flues horizontally positioned in said kettle each having one end connected to said entrance chamber member and the other end connected to said inter-pass chamber member, a plurality of substantially tubular second-pass flues horizontally mounted each having one end connected to said inter-pass chamber member and the other end connected to said exhaust chamber member, and port means for discharging said heating fluid from said exhaust chamber member.

3. A calcining apparatus according to claim 2, wherein said first-pass flues are arranged at each of three elevations, and said second-pass flues are arranged at each of three elevations.

4. A calcining apparatus according to claim 2, wherein four first-pass flues are disposed at each of three elevations.

5. A calcining apparatus comprising a calcining kettle of generally cylindrical form having side and bottom walls of heat conductive material and defining a unitary calcining chamber, a jacket surrounding said kettle and spaced therefrom to provide an annular heating chamber for containment of a heating medium, two vertically oriented baffles arranged between and sealed to said kettle sidewall and said jacket dividing said heating chamber into two heating chamber members extending along substantially the entire length of said jacket, one an entrance chamber member and the other an inter-pass chamber member, a plurality of substantially tubular first-pass flues horizontally positioned each having one end connected to said entrance chamber and the other end connected to said inter-pass chamber, a plurality of substantially tubular second-pass flues horizontally positioned and disposed within said kettle each having one end connected to said inter-pass chamber, an exhaust plenum having an exhaust chamber, means connecting said plenum exhaust chamber with the other ends of said second pass flues, and port means provided for discharging said medium.

6. A calcining apparatus according to claim 5, wherein partial height baffles are provided in said entrance chamber member for improving circulation of said heating medium.

7. A calcining apparatus according to claim 5, wherein said plenum chamber is connected to said second-pass flues by means of a flexible sealing joint, permitting said kettle to expand with relation to said plenum and said jacket.

8. A calcining apparatus according to claim 5, wherein said first-pass flues are mounted at each of two levels, and said second pass flues are mounted at each of two levels positioned above the levels of said first-pass flues.

9. A calcining apparatus comprising a calcining kettle of generally cylindrical form having side and bottom walls of heat conductive material and defining a unitary calcining chamber, a jacket surrounding said kettle and spaced therefrom to define an annular heating chamber for containment of a heating medium, two vertically oriented baffles arranged between and sealed to said kettle sidewall and said jacket dividing said heating chamber into two heating chamber members extending along substantially the entire length of said jacket, one an entrance chamber member and the other an inter-pass chamber member, a plurality of substantially tubular first-pass flues horizontally positioned and disposed within said kettle each having one end connected to said entrance chamber and the other end connected to said inter-pass chamber, a plurality of substantially tubular second-pass flues horizontally positioned and disposed within said kettle, each having one end connected to said inter-pass chamber, an inter-pass plenum mounted outside said jacket having an inter-pass plenum chamber, means connecting said inter-pass plenum chamber with the other ends of said second-pass flues, and a plurality of substantially tubular third-pass flues horizontally positioned and disposed within said kettle, means connecting said inter-pass plenum chamber with one end of each of said third-pass flues, a second jacket surrounding said kettle and spaced therefrom to define an annular exhaust chamber, the other end of each of said third-pass flues being connected to said exhaust chamber, and means for discharging said medium from said exhaust chamber.

10. A calcining apparatus according to claim 9, wherein the ends of said second-pass flues are connected to said inter-pass plenum chamber by means of flexible sealing joints, thereby permitting said kettle to move with respect to said first jacket and said inter-pass plenum.

11. A calcining apparatus according to claim 9, wherein an exhaust port is provided for said exhaust chamber.

12. A calcining apparatus according to claim 9, wherein the chamber defined by said second jacket and said kettle is provided with a pair of vertical baffles dividing said chamber into two parts, an entrance chamber member and an exhaust chamber member, wherein heat exchanger tubes connect said inter-pass plenum chamber with said entrance chamber member, and the entrance ends of said third-pass flues are connected to said entrance chamber member.

* * * * *